June 8, 1937.　　L. B. C. CUNNINGHAM　　2,083,057
TOWING OF VEHICLES
Filed May 11, 1936　　6 Sheets-Sheet 1
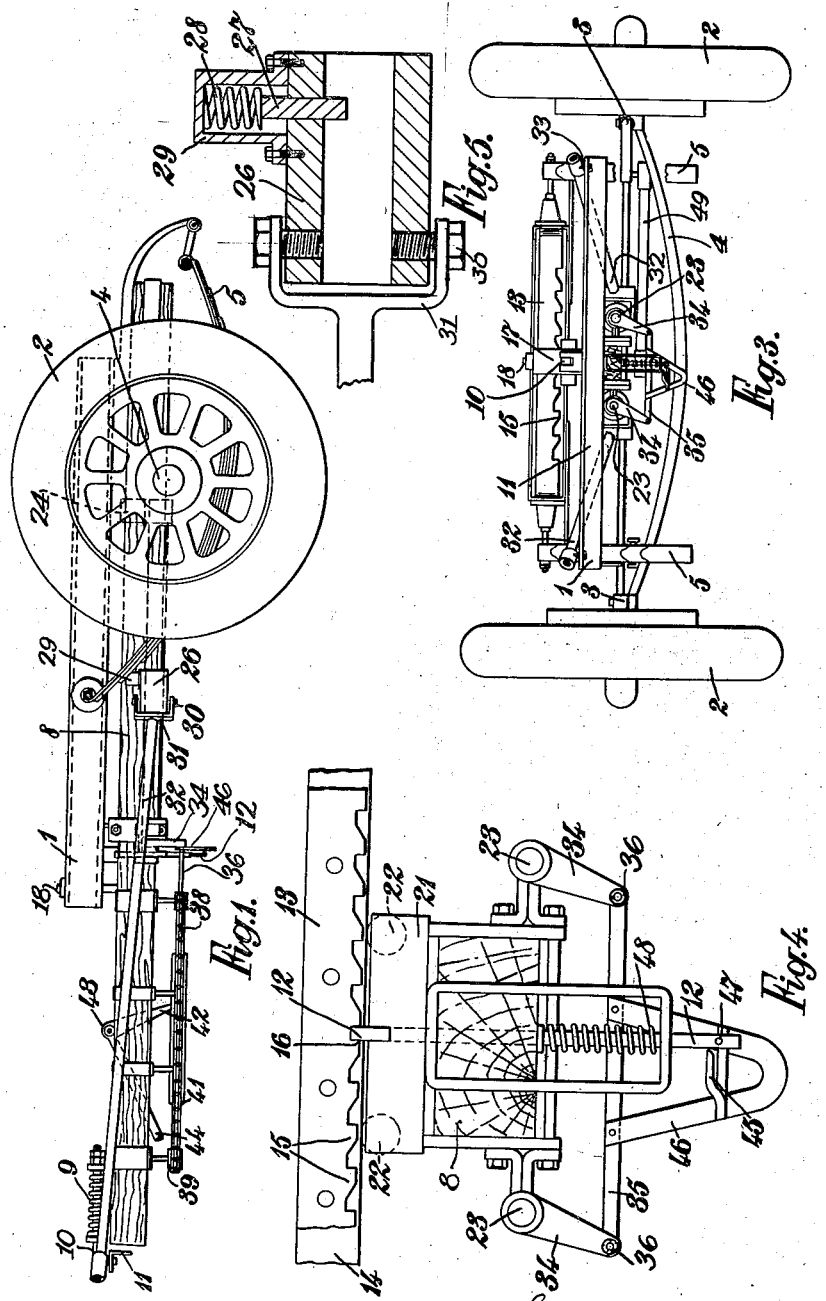
L. B. C. Cunningham
Inventor
By: Glascock Downing & Seebold
Attys.

June 8, 1937.  L. B. C. CUNNINGHAM  2,083,057
TOWING OF VEHICLES
Filed May 11, 1936   6 Sheets-Sheet 2
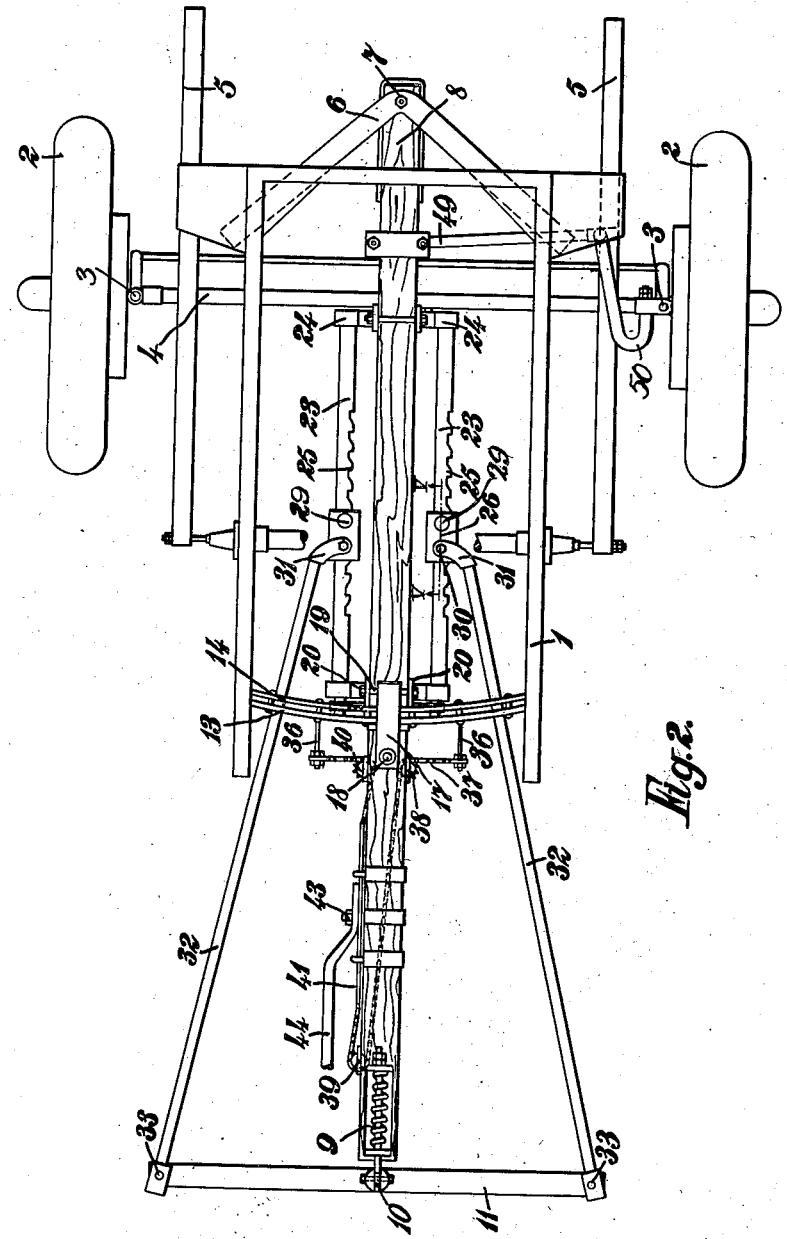

June 8, 1937.  L. B. C. CUNNINGHAM  2,083,057
TOWING OF VEHICLES
Filed May 11, 1936  6 Sheets-Sheet 3

L. B. C. Cunningham
Inventor
By: Glascock Downing &c.
Attys

June 8, 1937.  L. B. C. CUNNINGHAM  2,083,057
TOWING OF VEHICLES
Filed May 11, 1936   6 Sheets-Sheet 5

L. B. C. Cunningham
INVENTOR
By: Glascock Downing & Seebold
ATTYS.

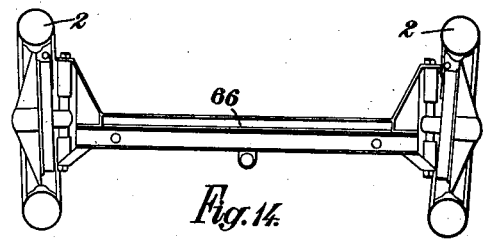
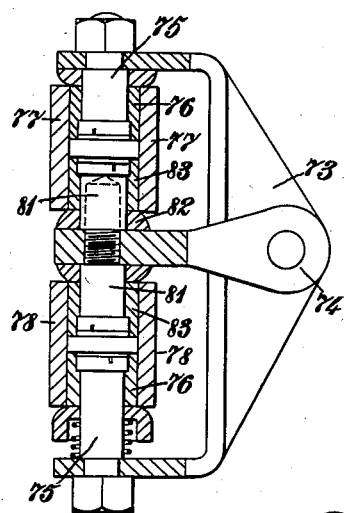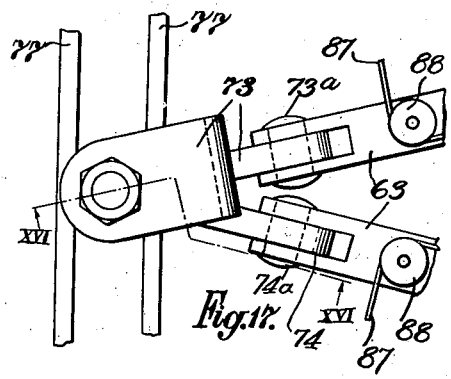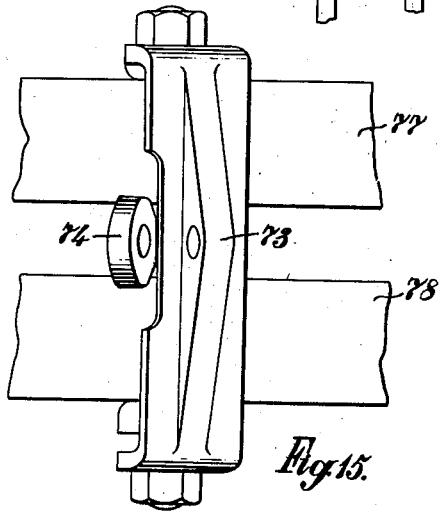

Patented June 8, 1937

2,083,057

UNITED STATES PATENT OFFICE 2,083,057

TOWING OF VEHICLES

Leslie Bennet Craigie Cunningham, Eastchurch, Sheppey, England, assignor to Reversible Trailers Syndicate, Limited, London, England Application May 11, 1936, Serial No. 79,160
In Great Britain October 25, 1934

12 Claims. (Cl. 280—33.55)

This invention relates to the towing of vehicles and particularly to trailers adapted to be associated with automobile vehicles and composite or articulated vehicles, including an automobile vehicle and a trailer such, for instance, as combinations of trailers with so-called mechanical horses or the like, and generally where a connection is provided between the trailer and the automobile vehicle of a character adapted to permit pivotal motion of the one relatively to the other.

At this point it may be mentioned that in some instances a vehicle associated with an automobile vehicle or propelling device may be arranged normally or generally to be moved in a direction in which it is in advance of the automobile vehicle.

Such may be the case, for instance, where guns mounted on carriages or other mobile devices designed for military operations, ploughs, cultivators, reapers and other machines intended for agricultural and other purposes are associated with automobile vehicles.

In view of the difference in the position as viewed from the direction of travel which the one vehicle may occupy with respect to the other vehicle, certain expressions are employed hereinafter in the following senses, namely:—

"Trailer" or "trailing vehicle" as denoting the vehicle connected with the driving vehicle, irrespective of whether it is associated with the automobile vehicle, in such manner that the latter functions normally as a tractor or pusher, "Advance" or "foremost" as denoting a position adjacent to the automobile vehicle, irrespective of whether it functions in the one or the other capacity above referred to, "Rear" or "rearmost" as denoting a position remote or more remote from the automobile vehicle, "Forward" as denoting motion in a direction such that the automobile vehicle precedes the trailer, "Reverse" as denoting motion in a direction such that the trailer as above defined precedes the automobile vehicle.

The invention consists in the provision of a connection between the automobile vehicle and the trailer permitting, when travelling in reverse, pivotal motion between them about a real or virtual axis located in the rear of the axle or the rearmost axle as the case may be of the trailer and precluding motion about said axis when travelling forward and in such case permitting pivotal motion between the two vehicles about an axis located in advance of the said axle of the trailer.

In certain constructions in accordance with the invention the connection may be such as to preclude pivotal motion between the bodies of the two vehicles when travelling in reverse at a point in advance of the axle or the foremost axle of the trailer.

In certain other constructions, in accordance with the invention, the connection may be such as to permit pivotal motion between the bodies of the two vehicles when travelling in reverse both about a real or virtual axis located in the rear of the axle or the rearmost axle of the trailer and about a point in advance of the said axle.

In the latter case the connection may comprise two bars or like rigid elements pivotally connected when travelling in reverse in the vertical plane of the axle or rearmost axle of the trailer at points located an appropriate distance apart and pivotally connected at their opposite ends with the automobile vehicle at points located at a distance apart greater than that of their points of connection with the axle or rearmost axle of the trailer, and when travelling forward at a distance apart less than the distance between their points of connection with the said axle and conveniently at points which substantially coincide or are in line vertically.

With such a construction the area bounded by the two bars or like rigid elements and the axle of the dumb vehicle and a line at right angles to the longitudinal axis of the automobile vehicle will be of trapezoidal form.

In the former case the main connection between the two vehicles may be a bar or like element pivotally connected with the automobile vehicle at a single point in advance of the axle or foremost axle of the trailer and in addition with the trailer at a point in the rear of the axle or rearmost axle thereof associated with suitable locking means adapted to preclude motion of the bar about the second-mentioned point when travelling forward, while permitting such motion when travelling in reverse and means for causing the bar to come into alignment with the main axis of the automobile vehicle and for locking it in this position and thereby preventing it from moving about the first-mentioned point when travelling in reverse.

Optionally, in accordance with the invention, the wheels of the trailer may be arranged to provide steering motion and be secured, for instance, to stub axles, in which case the connection between the automobile vehicle and the trailer is preferably such as to impart steering motion to such wheels in altering the course of the automobile vehicle when travelling in reverse.

Thus the connection may comprise a bar pivotally secured normally adjacent to the centre line or longitudinal axis of the automobile vehicle and at a point at or adjacent to the axle or rearmost axle of the trailer connected by suitable linkage with the steerable wheels thereof.

The member in question may, in fact, form the tow bar in the case of the construction provided with locking means operating as above defined.

Preferably, in accordance with the invention, means is provided for adjusting the connection automatically on the change in direction of travel of the automobile or trailer to permit or preclude pivotal motion between them about a real or virtual axis located in the rear of the axle or the rearmost axle of the trailer.

Thus, in the case of the construction provided with locking means such means may be arranged to be actuated automatically in changing the direction of the vehicle, while in the construction in which bars are arranged to enclose an area of trapezoidal form when the vehicles are travelling in reverse, means is provided adapted to be actuated automatically to bring the ends of the bars together in order to prevent pivotal motion between them about a real or virtual axis located in the rear of the axle or the rearmost axle of the trailer.

The following is a general description of certain constructions in accordance with the invention—

In the first of these constructions, instead of one tow bar as is customary two bars are employed and these two bars are adapted to be so arranged and manipulated as to improve the efficiency of the towing or pushing connection between the main vehicle and the trailer. The two bars are articulated at both ends and if the front separation or spacing of the articulated points is less than the back separation or spacing the trailer tends to be stable when towed. It will be understood that the area bounded by the two bars and the main and trailing vehicles is of trapezoidal form. If the front separation or spacing is greater than the rear separation or spacing the trailer tends to be stable in pushed motion. If the articulated points attached to the trailer are in a plane passing through the trailer axle and normal to the applied force these tendencies to stability are absolute and the stability of the trailer in reverse is positive.

The simplest form of the invention is that in which two tow bars of fixed and of equal length are connected to the main and trailing vehicles by articulated joints, the two joints associated with each vehicle being capable of adjustment as to the distance of transverse separation or spacing. In order to eliminate the mechanical means necessary to effect variation in the separation of the articulated joints a modified arrangement, as follows, may be employed. In this modified arrangement a framework of articulated rods or bars is provided which is composed as follows:—Two comparatively long bars have a common pivotal point or centre at or adjacent the rear axle of the main vehicle and these diverge in V-form rearwardly from said main vehicle. The mouth of the V is closed by a transverse bar, articulated to the extremities of the limbs of the V, the three bars constituting an isosceles triangle. From the two base corners of this triangle rearwardly extend a pair of shorter bars, pivotally connected to the aforesaid base corners of the triangle and also to or adjacent the front axle of the trailer, the resultant frame being somewhat of flat-topped kite form. In effect, the two shorter bars, by reason of their articulated connections, constitute an area or figure of trapezoidal form as in the simpler arrangement first described. To or adjacent the rear axle of the main vehicle is pivotally connected a further long rigid bar or equivalent member (hereafter called the side locking member) which is slidably received within a pivoted bush located at one of the base corners of the isosceles triangular arrangement of bars already referred to. The side locking bar is adapted to be locked in the pivoted bush so as to arrest its sliding movement. This slidable rigid bar could be replaced by a flexible cable held taut by spring means. Pivotally connected to the same corner of the isosceles triangle as that at which the aforesaid pivoted side-bar bush is located is another bar which is directed slantingly or at an angle to the transverse bar spanning the V-disposed long bars. This slanting bar passes through a pivoted bush mounted substantially midway along the short bar which is connected to the trailer axle and to the remote or opposite base corner of the triangle to that at which the slanting bar is pivotally connected. This slanting bar is also adapted to be locked against sliding movement within its pivoted bush so as to constitute a rigid strut or stay.

If the slanting bar is locked as above mentioned and the side bar allowed freedom of sliding movement within its pivoted bush, the framework referred to above is substantially of kite shape and consisting of the three triangularly disposed bars and the two shorter bars at the base corners thereof becomes a rigid frame pivoted at the apex of the two long V-disposed bars, and thus constitutes in effect a plain tow bar connection which is stable in towing. If, however, the side bar is held against sliding movement and the slanting bar is free to slide the side bar and the adjacent bar of the two V-disposed bars form the effective tow bar and the apparatus becomes stable in pushed motion. The locking member may be duplicate, if desired, such as by two cables on opposite sides of and connected to the ends of the V-disposed bars.

It will be readily understood that in both of these conditions (when the apparatus is manipulated to be stable in towed or in pushed motion) that the characteristic feature previously referred to obtains; that is, the separation of the articulated joints is arranged so that the separation is smaller at the main vehicle end of the apparatus for towed motion and smaller at the trailer end for pushed motion.

In an alternative construction there is employed a rigid tow bar which is pivoted at both ends, the rear pivot being attached to the trailer at a point behind its axle. Provision is made either to prevent rotation about the rear pivot, while the front pivot is free, or to prevent rotation about the front pivot while the rear pivot is free. With the former setting, the trailer is stable when towed, and with the latter setting it is stable when pushed.

These alternative settings may be effected as follows:—

To prevent rotation about the rear pivot, the front cross-member of the trailer chassis (or its equivalent) may pass, and be able to slide through, a pivoted bush, whose pivot slides lengthwise along the tow bar. Both bush and bush-pivot may be clamped for towing. Or the front cross-member of the trailer chassis may simply pass between the flat, parallel surfaces of two members carried by the tow bar, which can be clamped together for towing. Or the tow bar may pass between two similar surfaces carried by the front cross-member of the chassis, or it may pass through a pivoted bush whose pivot may slide across this member.

To prevent rotation about the front pivot the tow bar may be stayed by flexible stays between points on the tow bar towards its rear end and the outer extremities of the rear of the towing vehicle; or it may be strutted by one or more struts between the tow bar and towing vehicle which slide through a pivoted bush at one end, and are jointed at the other. The flexible stays would be spring-loaded for towing, but clamped for pushing; while the pivoted bush or bushes would be capable of being clamped to the struts for the latter setting.

The trailer axle may carry its wheels on stub-axles pivoted on swivel pins, as in an ordinary automobile front axle, and the motion of the trailer in reverse may be assisted by communicating to the stub-axles by a suitable linkage, the angular motion of the tow bar relative to the trailer.

The clamps effecting the alternative settings may be interconnected and spring-loaded to revert to the setting suitable for towing. A frictional device, operating when motion is in reverse, may be employed to effect the change-over automatically.

The invention will be described further in detail and by way of example with reference to the accompanying drawings in which:—

Figure 1 is a view in side elevation of a trailer according to one construction of the invention of which Figure 2 is a corresponding plan view and Figure 3 is a front elevation.

Figure 4 is a fragmentary view on a larger scale illustrating certain details of the construction in question, and Figure 5 is a view of a section along the line V—V of Figure 2;

Figure 14 is a transverse part section on the line XIV—XIV of Figure 12;

Figures 15, 16 and 17 are, respectively, diagrammatic illustrations of the positions assumed by certain essential elements of this construction in travelling forward and in reverse, the section in Figure 16 being taken along the line XVII—XVII of Figure 17.

Figure 6:
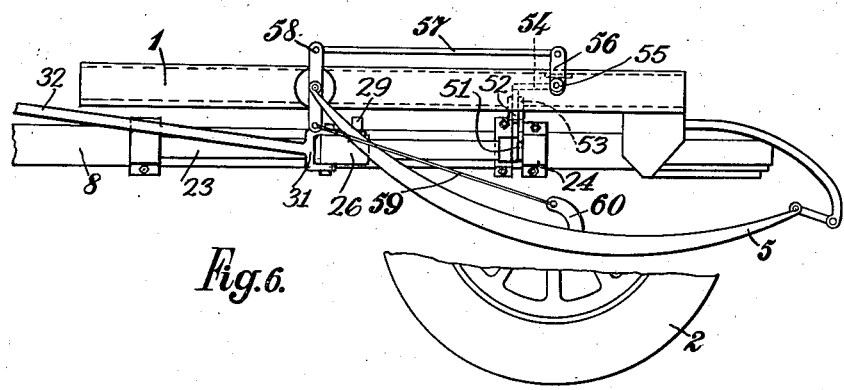
Figures 6, 7 and 8 are views illustrating other constructional details which may optionally be embodied in the constructions illustrated in Figures 1 to 4.
Figure 7:
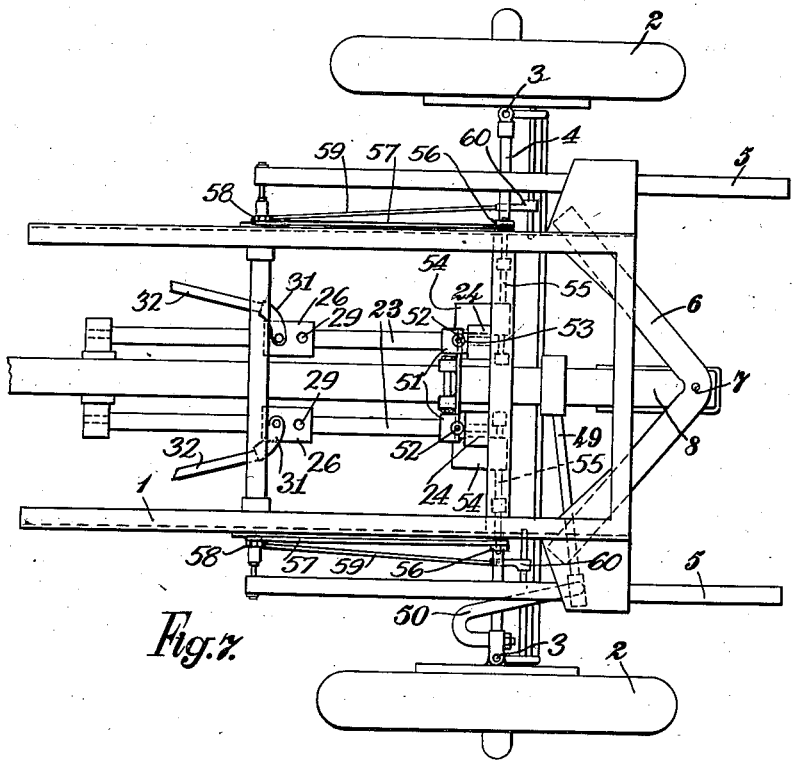

In the construction illustrated by Figures 1 to 7, the frame of the trailing vehicle 1 is provided with steerable wheels 2, connected by swivel joints 3 with the axle 4 in turn connected with the frame of the vehicle by means of the springs 5. To a member 6 secured to the frame of the vehicle there is pivotally connected by the pin 7, the tow bar 8, the forward end of which is provided with a spring traction buffer 9 through the intermediary of which it is connected by the pin 10 with the rearward portion 11 of the towing vehicle or a bar secured thereto.

In towing, the tow bar is precluded from pivotal motion about the pin 7 by the engagement of the bolt 12 with the rack 13 secured adjacent to a back-plate 14 and furnished with two sets of reversely directed ratchet teeth 15 so formed that should the tow bar have been moved from its normally central position about the pivot 7 to one side or the other, the face of the bolt will slide over the faces of the ratchet teeth and finally engage in the recess 16 in the centre of the rack. Over the upper edge of the rack there extends a plate 17 secured at one end to the tow bar by the bolt 18 and engaging a bolt 19 extending between two brackets 20, and on the tow bar there is arranged a member 21 in which rollers 22 bearing upon the back-plate 14 above referred to are mounted. In the brackets 20 one end of each of the toothed rods 23 is engaged, the opposite ends of these rods being rotatably engaged in brackets 24 positioned adjacent to the axle. The teeth 25 on the rods are also reversely directed ratchet teeth, and at a position intermediate between the two sets of ratchet teeth there is provided a recess similar to the recess 16 furnished in the rack 13 above referred to. On each of the rods is slidably mounted a sleeve 26 in which is arranged a catch 27 with which is associated a spring 28, housed in a casing 29, as shown in Figure 5. To each of the sleeves is pivotally connected by pins 30 the forked end 31 of the rod 32, the other end of which is pivotally connected by pins 33 with the rearward portion 11 of the towing vehicle.

In towing, the sleeves 26 are free to slide along the rods 25 while when travelling in reverse the rods 23 in question are through the intermediary of the means hereinafter referred to rotated by the actuation of the arms 34 connected with the ends of the rods and linked together by the bar 35 to bring the teeth on the bars into position to be engaged by the catches associated with the sleeves 26.

On each of the arms 34 there is provided an extension 36 to which are connected the opposite ends of a chain 37 guided about pulleys 38, 39 and 40. On the chain is mounted a sleeve 41 provided with lugs (not shown) engaging the end of the arm 42 of the bell crank lever pivoted on the pin 43, the other arm 44 of the lever being connected with any suitable means accessible to the driver of the vehicle so that it may be actuated by him when desired.

Turning the arms into the position for travelling in reverse from the position illustrated in Figure 4 by movement of the chain causes the member 45 secured on the bracket 46 to move into a position in which its forked end will engage the pin 47 on the bolt 12 and move it in opposition to the spring 48 so as to disconnect it from its centralized position on the rack.

The tow bar will in such case be then free to move about the pin 7 insofar as it may not be prevented from doing so by the engagement of the spring catches 27 with the rods 23.

Such pivotal motion will cause motion to be transmitted through the drag link 49 to the arm 50 to one of the road wheels which will as is usual be connected by a link with a similar arm provided on the pivot of the other road wheel as is usual in connection with the front axle of road vehicles.

Figure 8:
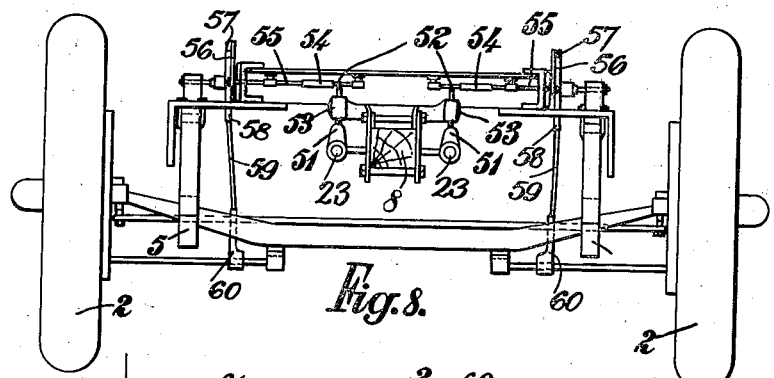

To further assist in imparting trailing motion to the vehicle by recentralizing the trailer chassis relative to the tow bar or in other words by bringing the tow bar back into a position in which it is at right angles to the axle of the trailer, after stopping on a turn in reverse, on the ends of the rods 25 are provided cams 51 as shown in Figure 8 which are brought into position below the ends of rods 52 slidably mounted in guides 53 and these rods are thus brought into a position in which they may contact with flaps 54 secured on rods 55 rotatably mounted and each connected by means of an arm 56, rod 57, lever 58 and cable 59 with a lever 60 adapted to actuate a brake associated with one of the road wheels.

As will be seen according to whether or no the trailer chassis has been moved to one or other side from its centralized position with respect to the tow bar when travelling in reverse, the mechanism mounted thereon, namely, the rods 53 and the cams on the ends of the rods 25 will be in a position in which one or other of the rods will engage below one or other of the flaps 54 thus braking one or other of the wheels, whereas when the tow bar is in the centralized position both in towing and in moving in reverse the brakes on such of the wheels will be in the off position.

Figure 9:
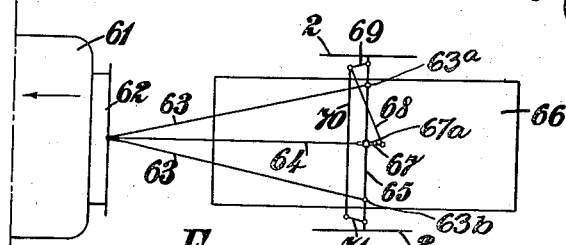
Figures 9, 10 and 11 are diagrammatic views illustrating an alternative construction of trailer connected with the rear of the towing vehicle and showing the relative positions which certain elements assume in forward towing, in straight reverse and in reversing on a circle.
Figure 10:
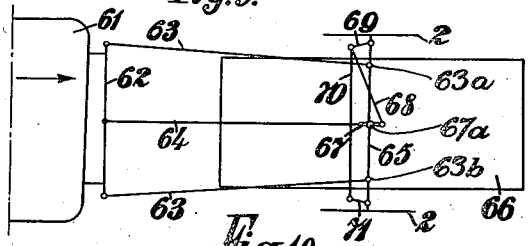
Figure 11:
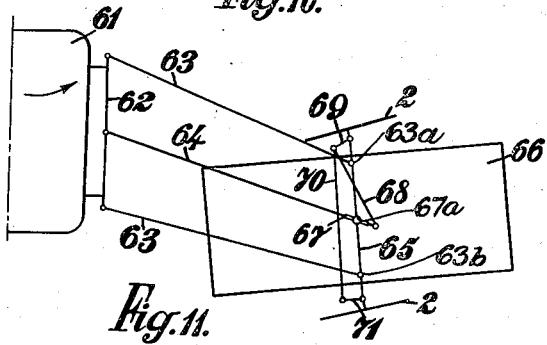

The general arrangement and operation of the construction illustrated in Figures 12 to 17 may be gathered from Figures 9 to 11 which diagrammatcially represent the essential details of such a construction.

In Figures 9, 10 and 11, 61 represents the tail end of the towing vehicle, 62 a bar secured thereto from which extend two side rods 63 and a central bar 64, the two former being connected with the ends of the cross bar 65 secured to the towing vehicle chassis indicated by the reference 66 while the latter is provided with a pair of rollers, not shown, between which is engaged the bearer bar 66ª also secured to the towing vehicle chassis.

The bar 64 passing through a sleeve 67 which is pivotally connected at 67ª with the frame of the towed vehicle and is also connected with the rod 68, in turn connected with one of the steering arms 69 of one of the wheels which, in turn, is connected by the track rod 70 with the steering arm 71 of the other wheel. In towing the several bars are in the position shown in Figure 9, that is to say, they are all brought together and pivot on a common axis on the bar 62.

In travelling in reverse the rods 63 are moved outward along the bar 62 until they assume the position shown in Figure 10 which will be later described.

In reverse, assuming that the towing vehicle is moving in the direction of the arrow, the several bars will assume a position generally as shown in the figure, and as will be seen, the bar 64 will then be in a position to swivel the road wheels of the trailer into an appropriate angle with the body of the trailer as the result of steering motion being imparted to the towing vehicle.

Figures 12, 13:
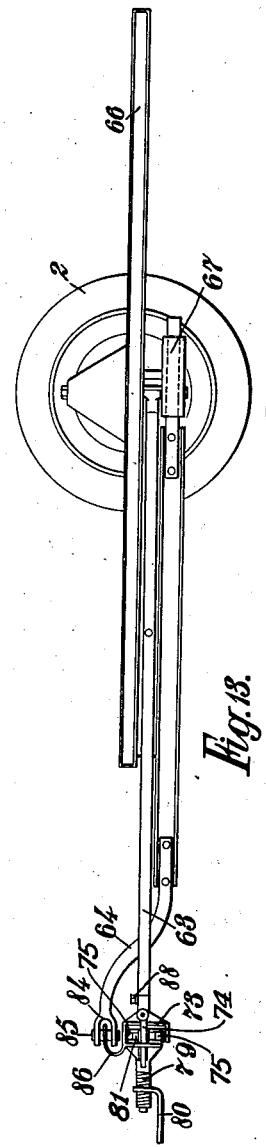
Figure 12 is a view in plan of the second construction of trailer shown connected with the tail of a towing vehicle.
Figure 13 is a section on the line XIII—XIII of Figure 12.

In Figures 12 to 14 the same references are employed in connection with the parts shown in Figure 10, while as in the previous construction the wheels are indicated by the reference 2.

The rods 63 are connected together by a return spring 72 and each of them is at one end pivotally connected at 63ª, 63ᵇ with the cross bar 65 secured to the frame of the towed vehicle. The other ends are connected respectively to lugs 73 and 74 by the pivotal connections 73ª, 74ª as shown in Figure 17. The latter of these lugs is provided with pins 75 on which are mounted rollers 76 engaging between the two sets of parallel bars 77, 78 which are connected through spring buffers 79 with brackets 80 arranged on the rear of the car. The lug 74 is furnished with a pin 81 passing through a ball member 82 and engaging at each end rollers 83 also engaged between the bars so that, referring to Figure 14, one of the lugs, namely, lug 73, and its associated parts may be moved to the right of the figure and lug 74 to the left to bring the ends of the bars into a position corresponding with that shown in Figures 9 and 10.

The rod 74 is cranked in an upward direction and provided with a forked end 84 connected by a pin 85 with the bracket 86, on the tail end of the towing vehicle.

To impart motion to the rods 63 in the construction shown there is provided a cable 87 guided about rollers 88 provided on the bars so that by tension applied to the cable they may be moved in opposition to the return spring 72. Such tension is applied to the cable in changing the direction of travel of the trailing vehicle from forward to reverse through the intermediary of any suitable means acting either automatically upon change in direction of movement of the vehicles or under the control of the driver such as a hand operated lever. It will be seen that with the construction illustrated in Figures 12 to 17 the side rods 63 operate as tow bars in such manner that when they are in the position which they occupy when the vehicles are in reverse their point of intersection were they to be extended would lie behind the axle of the towed vehicle, this arrangement providing a virtual pivot about which the towed vehicle moves when the vehicles are in reverse. The central bar 64 does not in this construction operate as a tow bar, its essential function being to stead the bucking motion of the chassis of the towed vehicle. It is also employed in the construction illustrated to impart suitable movement to the stub axles for the purpose of steering the towed vehicle when in reverse.

On the other hand, with the construction illustrated in Figures 1 to 7 the trailer when the vehicles are moved in reverse pivots about a real axis which is obtained by pivotally connecting a single tow bar 8 with the chassis of the towed vehicle at a point to the rear of the axle thereof.

I claim:

1. A towed vehicle having wheels secured to an axle and comprising a member for connection between it and a towing vehicle adapted to restrict the motion of the one vehicle towards the other, means on said member adapted to permit pivotal motion in a horizontal plane between it and the towing vehicle, and a pivotal connection between the said member and the towed vehicle permitting motion of the later with respect to the towing vehicle about a vertical axis in the rear of the axle of the towed vehicle when the vehicles are moving in reverse, and locking means for precluding motion of the towed vehicle about such point when the vehicles are moving forward.

2. A towed vehicle having wheels secured to an axle and means for connection with a towing vehicle comprising a member arranged in advance of the towed vehicle tranversely of the longitudinal axis thereof, a bar extending from the transversely arranged member to the towed vehicle, a pivotal connection between one end of the bar and the transversely arranged member, a pivotal connection between the other end of the bar and the towed vehicle, a rod extending from the transversely arranged member to the towed vehicle upon one side of the bar, a pivotal connection between one end of the rod and the said transversely arranged member, a pivotal connection between the other end of the rod and the towed vehicle, a further rod extending from the transversely arranged member to the towed vehicle upon the other side of the bar, a pivotal connection between one end of the said further rod and the said transversely arranged member, a pivotal connection between the other end of the said further rod and the towed vehicle, and means adapted to lock the said bar against movement about its pivotal connection with the towed vehicle when the vehicles are moving forwards, and to permit such pivotal movement to take place when the vehicles are moving in reverse.

3. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle, steering mechanism interconnecting the bar with the wheels of the towed vehicle whereby as a consequence of movement of the bar about the pivotal connection between it and the towed vehicle steering motion is imparted to the said wheels, a rod extending from the transversely arranged member to the towed vehicle upon one side of the bar, a pivotal connection between one end of the rod and the said transversely arranged member, a pivotal connection between the other end of the rod and the towed vehicle, a further rod extending from the transversely arranged member to the towed vehicle upon the other side of the bar, a pivotal connection between one end of the said further rod and the said transversely arranged member, a pivotal connection between the other end of the said further rod and the towed vehicle, and means adapted to lock the said bar against movement about its pivotal connection with the towed vehicle when the vehicles are moving forwards, and to permit such pivotal movement to take place when the vehicles are moving in reverse.

4. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle, a rod extending from the transversely arranged member to the towed vehicle upon one side of the bar, a pivotal connection between one end of the rod and the said transversely arranged member, a displaceable member connected with the towed vehicle upon the same side of the bar, a pivotal connection between the other end of the rod and the said displaceable member, a further rod extending from the transversely arranged member to the towed vehicle upon the other side of the bar, a pivotal connection between one end of the said further rod and the said transversely arranged member, a further displaceable member connected with the towed vehicle upon the said other side of the bar, a pivotal connection between the other end of the said further rod and the said further displaceable member, and means adapted when the vehicles are moving forwards to lock the said bar against movement about its pivotal connection with the towed vehicle while permitting displacement of the displaceable members relative to the towed vehicle and when the vehicles are moving in reverse to permit such pivotal movement while locking the said displaceable members against displacement relative to the towed vehicle.

5. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle, steering mechanism interconnecting the bar with the wheels of the towed vehicle whereby as a consequence of movement of the bar about the pivotal connection between it and the towed vehicle steering motion is imparted to the said wheels, a rod extending from the transversely arranged member to the towed vehicle upon one side of the bar, a pivotal connection between one end of the rod and the said transversely arranged member, a displaceable member connected with the towed vehicle upon the same side of the tow bar, a pivotal connection between the other end of the rod and the said displaceable member, a further rod extending from the transversely arranged member to the towed vehicle upon the other side of the bar, a pivotal connection between one end of the said further rod and the said transversely arranged member, a further displaceable member connected with the towed vehicle upon the said other side of the bar, a pivotal connection between the other end of the said further rod and the said further displaceable member, and means adapted when the vehicles are moving forwards to lock the said bar against movement about its pivotal connection with the towed vehicle while permitting displacement of the displaceable members relative to the towed vehicle and when the vehicles are moving in reverse to permit such pivotal movement while locking the said displaceable members against displacement relative to the towed vehicle.

6. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle at a point lying to the rear of the axle of the said vehicle, a rod extending from the transversely arranged member to the towed vehicle upon one side of the bar, a pivotal connection between one end of the rod and the said transversely arranged member, a displaceable member connected with the towed vehicle upon the same side of the bar, a pivotal connection between the other end of the rod and the said displaceable member, a further rod extending from the transversely arranged member to the towed vehicle upon the other side of the bar, a pivotal connection between one end of the said further rod and the said transversely arranged member, a further displaceable member connected with the towed vehicle upon the other side of the bar, a pivotal connection between the other end of the said further rod and the said further displaceable member, and means adapted when the vehicles are moving forwards to lock the said bar against movement about its pivotal connection with the towed vehicle while permitting displacement of the displaceable members relative to the towed vehicle and when the vehicles are moving in reverse to permit such pivotal movement while locking the said displaceable members against displacement relative to the towed vehicle.

7. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle at a point lying to the rear of the axle of the said vehicle, a lockable connection between the bar and the towed vehicle adapted when released to permit movement of the bar about its pivotal connection with the said vehicle and when locked to preclude such movement, a rod extending from the transversely arranged member to the towed vehicle upon one side of the bar, a pivotal connection between one end of the rod and the said transversely arranged member, a displaceable member associated with the towed vehicle upon the same side of the bar, a pivotal connection between the other end of the rod and the said displaceable member, a lockable connection between the said displaceable member and the towed vehicle adapted when released to permit displacement of the displaceable member relative to the said vehicle and when locked to preclude such displacement, a further rod extending from the transversely arranged member to the towed vehicle upon the other side of the bar, a pivotal connection between one end of the said further rod and the said transversely arranged member, a further displaceable member associated with the towed vehicle upon the said other side of the bar, a pivotal connection between the other end of the said further rod and the said further displaceable member, a lockable connection between the said further displaceable member and the towed vehicle adapted when released to permit displacement of the said further displaceable member relative to the said vehicle and when locked to preclude such displacement, and means adapted when the vehicles are moving forwards to lock the first mentioned lockable connections and when the vehicles are moving in reverse to release the said first mentioned lockable connection while locking the said second and third mentioned lockable connections.

8. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle at a point lying to the rear of the axle of the said vehicle, a lockable connection between the bar and the towed vehicle adapted when released to permit movement of the bar about its pivotal connection with the said vehicle and when locked to preclude such movement, steering mechanism interconnecting the bar with the wheels of the towed vehicle whereby as a consequence of movement of the bar about the pivotal connection between it and the towed vehicle steering motion is imparted to the said wheels, a rod extending from the transversely arranged member to the towed vehicle upon one side of the bar, a pivotal connection between one end of the rod and the said transversely arranged member, a displaceable member associated with the towed vehicle upon the same side of the bar, a pivotal connection between the other end of the rod and the said displaceable member, a lockable connection between the said displaceable member and the towed vehicle adapted when released to permit displacement of the displaceable member relative to the said vehicle and when locked to preclude such displacement, a further rod extending from the transversely arranged member to the towed vehicle upon the other side of the bar, a pivotal connection between one end of the said further rod and the said transversely arranged member, a further displaceable member associated with the towed vehicle upon the said other side of the bar, a pivotal connection between the other end of the said further rod and the said further displaceable member, a lockable connection between the said further displaceable member and the towed vehicle adapted when released to permit displacement of the said further displaceable member relative to the said vehicle and when locked to preclude such displacement, and means adapted when the vehicles are moving forwards to lock the first mentioned lockable connection while releasing the second and third mentioned lockable connections and when the vehicles are moving in reverse to release the said first mentioned lockable connection while locking the said second and third mentioned lockable connections.

9. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle, a rod extending from the transversely arranged member to the towed vehicle upon one side of the bar, a pivotal connection between one end of the rod and the said transversely arranged member, a pivotal connection between the other end of the rod and the towed vehicle, a further rod extending from the transversely arranged member to the towed vehicle upon the other side of the bar, a pivotal connection between one end of the said further rod and the said transversely arranged member, a pivotal connection between the other end of the said further rod and the towed vehicle, and means adapted to displace the said rods about their pivotal connections with the towed vehicle to a position in which when the vehicles are moving forwards the pivotal connections of the rods with the transversely arranged member are substantially coaxial with the pivotal connection of the bar with the said transversely arranged member and to displace the said rods about their pivotal connections with the towed vehicle to a position in which when the vehicles are moving in reverse the pivotal connections of the rods with the transversely arranged member are spaced apart upon either side of the pivotal connection of the bar with the said transversely arranged member.

10. A towed vehice having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle, steering mechanism interconnecting the bar with the wheels of the towed vehicle whereby as a consequence of movement of the bar about the pivotal connection between it and the towed vehicle steering motion is imparted to the said wheels, a rod extending from the transversely arranged member to the towed vehicle upon one side of the bar, a pivotal connection between one end of the rod and the said transversely arranged member, a pivotal connection between the other end of the rod and the towed vehicle, a further rod extending from the transversely arranged member to the towed vehicle upon the other side of the bar, a pivotal connection between one end of the said further rod and the said transversely arranged member, a pivotal connection between the other end of the said further rod and the towed vehicle and means adapted to displace the said rods about their pivotal connections with the towed vehicle to a position in which when the vehicles are moving forwards the pivotal connections of the rods with the transversely arranged member are substantially coaxial with the pivotal connection of the bar with the said transversely arranged member and to displace the said rods about their pivotal connections with the towed vehicle to a position in which when the vehicles are moving in reverse the pivotal connections of the rods with the transversely arranged member are spaced apart upon either side of the pivotal connection of the bar with the said transversely arranged member.

11. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle, a rod extending from the transversely arranged member to the towed vehicle upon one side of the bar, a bracket slidably engaging the transversely arranged member, a pivotal connection between one end of the rod and the said bracket, a pivotal connection between the other end of the rod and the towed vehicle, a further rod extending from the transversely arranged member to the towed vehicle upon the other side of the bar, a further bracket slidably engaging the transversely arranged member, a pivotal connection between one end of the said further rod and the said further bracket, a pivotal connection between the other end of the said further rod and the towed vehicle, and means adapted to displace the said brackets along the transversely arranged member to a position in which when the vehicles are moving forwards the pivotal connections of the rods with the brackets are substantially coaxial with the pivotal connection of the bar with the said transversely arranged member and to displace the said brackets along the transversely arranged member to a position in which when the vehicles are moving in reverse the pivotal connections of the rods with the brackets are spaced apart upon either side of the pivotal connection of the bar with the said transversely arranged member.

12. A towed vehicle having wheels secured to an axle and means for connection with a towing vehicle comprising a member arranged in advance of the towed vehicle transversely of the longitudinal axis thereof, a bar extending from the transversely arranged member to the towed vehicle, a pivotal connection between one end of the bar and the transversely arranged member, a pivotal connection between the other end of the bar and the towed vehicle, steering mechanism interconnecting the bar with the wheels of the towed vehicle whereby as a consequence of movement of the bar about the pivotal connection between it and the towed vehicle steering motion is imparted to the said wheels, a rod extending from the transversely arranged member to the towed vehicle upon one side of the bar, a bracket slidably engaging the transversely arranged member, a pivotal connection between one end of the rod and the said bracket, a pivotal connection between the other end of the rod and the towed vehicle, a further rod extending from the transversely arranged member to the towed vehicle upon the other side of the bar, a further bracket slidably engaging the transversely arranged member, a pivotal connection between one end of the said further rod and the said further bracket, a pivotal connection between the other end of the said further rod and the towed vehicle, and means adapted to displace the said brackets along the transversely arranged member to a position in which when the vehicles are moving forwards the pivotal connections of the rods with the brackets are substantially coaxial with the pivotal connection of the bar with the said transversely arranged member and to displace the said brackets along the transversely arranged member to a position in which when the vehicles are moving in reverse the pivotal connections of the rods with the brackets are spaced apart upon either side of the pivotal connection of the bar with the said transversely arranged member.

LESLIE BENNET CRAIGIE CUNNINGHAM.